United States Patent [19]

Siebeneck et al.

[11] 4,310,842

[45] Jan. 12, 1982

[54] PULSED DOPPLER RADAR SYSTEM

[75] Inventors: Jürgen Siebeneck; Uwe Feddern, both of Norderstedt, Fed. Rep. of Germany

[73] Assignee: U.S. Philips Corporation, New York, N.Y.

[21] Appl. No.: 119,911

[22] Filed: Feb. 8, 1980

[30] Foreign Application Priority Data

Feb. 24, 1979 [DE] Fed. Rep. of Germany ....... 2907315

[51] Int. Cl.³ .............................................. G01S 13/04
[52] U.S. Cl. ............................ 343/5 PD; 343/5 DD; 343/8
[58] Field of Search ..................... 343/5 PD, 8, 5 DD

[56] References Cited

U.S. PATENT DOCUMENTS 3,603,999  9/1971  Palleiko ....................... 343/5 PD X
4,160,248  7/1979  Hubka et al. ......................... 343/8

*Primary Examiner*—T. H. Tubbesing
*Attorney, Agent, or Firm*—Thomas A. Briody; David R. Treacy; Robert J. Kraus

[57] ABSTRACT

When the transmitter is operated in the keyed mode, the HF properties of the Gunn diode change because the diode warms up during the pulses and cools again in the pulse intervals. With a transmission frequency of 30.5 GHz a frequency change of 10 MHz was found during the duration of a pulse, this frequency change being highest at the beginning of the pulses and lowest at the end of the pulses. For this reason the evaluation circuit is constructed so that it evaluates only during a very short period of the pulse duration. Then, namely, the doppler signal can be made "visible" to a sufficient extent.

3 Claims, 3 Drawing Figures

PULSED DOPPLER RADAR SYSTEM

BACKGROUND OF THE INVENTION

The invention relates to a pulsed doppler radar system comprising a transmitter for transmitting pulse-shaped signals and a receiver having a mixing device to which the transmitter signal and a received transmitter signal reflected from a target are applied, also comprising an evaluation circuit connected to the mixing device.

When measuring apparatus are used for velocity measurements by means of a so-called doppler radar, a transmitter is generally used in which the transmitter signal is radiated in the so-called continuous wave mode. The relatively high current consumption this requires is not important when the required voltage can be obtained from power mains or for a short period of time from a car battery. Completely different requirements must be satisfied when the doppler radar devices must be used for intrusion detection systems as they must then compete with intrusion detection systems which operate on infrared bases. These intrusion detection systems must namely satisfy the requirement that they can be switched over automatically to battery supply in the case of a power cut. The current consumption of such a system is then decisive for the period of time in which performance reliability is still certain.

An intrusion detection system having a short wave doppler radar module, type indication MDX 0724, is disclosed in Valvo Brief "Messeinformationen Hannover" 1978, dated 19.4.1978, page 50 section 1. In conjunction therewith there is a further publication for the unit MDX 0622 for an X-band doppler radar unit. In addition thereto, Messrs. Valvo published a provisional data sheet in March 1978, for the short wave doppler radar module which relates to a compact VHF transmission-receiving unit with a stable, cavity Gunn-oscillator and having a diode mixer and planar transmitting-receiving aerial structure for the construction of motion detectors. The module described there has a range of 15 m and an operating current of 150 mA. The operating frequency is 13.55 GHz.

The 150 mA operating current for the module MDX 0524 was high and therefore a doppler radar module MDX 0724, which operates in the pulse mode and has a current of 15 mA was already proposed in the publication Valvo Brief dated 19.4.1978 on the Hannover Fair 1978. Only the HF portion with the control circuit was shown on the Hannover Fair. The evaluation circuit was lacking and the present invention relates to a portion of this evaluation circuit arrangement.

On the basis of the above prior art it was known to operate a doppler radar in the GHz range with a keyed transmitter oscillator. When a simple Gunn oscillator is keyed by means of its operating voltage, its frequency changes during the keying pulses as the result of the fact that the HF oscillator is warmed up during each pulse. A requirement was that the doppler signal frequency must yet be separated from the keying frequency. For the known devices, which operate at approximately 10 GHz the doppler signal frequency amounts up to 100 Hz and when the doppler signal must still be visible with a keyed transmitter, the keying frequency must be higher than 200 Hz. The invention had therefore for its object to take all these known problems into consideration and to propose a switching arrangement in which a certain optimization is obtained.

SUMMARY OF THE INVENTION

To accomplish this object the invention proposes to construct the evaluation circuit arrangement in a circuit arrangement for the evaluation of doppler radar signals for a doppler radar operating in the GHz range of the type defined in the opening paragraph such that evaluation is effected in only a portion of the keying period of the so-called evaluation period. In a further embodiment of the invention the evaluation period may amount to only 10 to 20% of the keying period, calculated from the trailing edge of the keying pulse. The keying frequency is, preferably, approximately 1 kHz.

According to the invention a circuit arrangement for the evaluation circuit arrangement is characterized in that the evaluation circuit is of such a construction that the output signal of the mixing device is evaluated only during an evaluation period which is only a portion of the pulse duration of each transmitter pulse.

An embodiment of the invention will now be further described with reference to the accompanying drawing. Herein

DESCRIPTION OF THE PREFERRED EMBODIMENT

The mode of operation of the invention will now first be explained with reference to the graph of FIG. 1, reference also being made to the circuit arrangement shown in FIG. 2.

Figure 2:
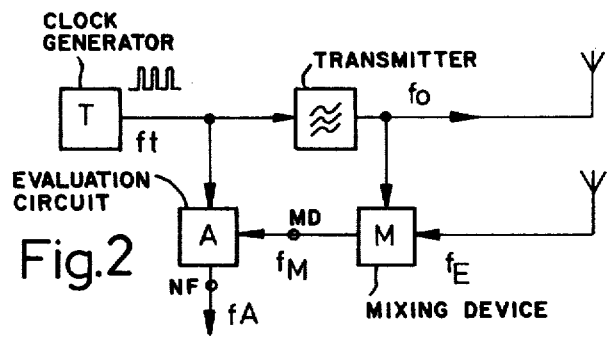
FIG. 2 shows a portion of the pulsed doppler radar device.

FIG. 2 shows a transmitter whose high-frequency output signal $f_o$ is located in the GHz range. This transmitter signal reaches the aerial, more precisely the transmitting aerial. The signal is received again from the receiving aerial after it has reflected from a target and is then called the received signal $f_E$. The transmitter signal as well as the received signal reach, in known manner, a mixing device M and the signal $f_M$ is available at the output of the mixing device and is applied to an evaluation circuit A. The evaluation signal $f_A$ is available at the output of the evaluation circuit. So far the circuit arrangement shown in FIG. 2 is similar to the prior art arrangement. As long as the transmitting antenna is operative on a stationary target, the received signal $f_E$ has a constant phase shift relative to the transmitter signal $f_o$ and the signal $f_M$ obtained from the mixing device includes no doppler signal. It consists only of a constant direct voltage $U_O$. When a target, for example an intruder, moves into the relevant range, for example within 15 m, the phase of the signal $f_E$ changes relative to the phase of the signal $f_o$ and a doppler voltage is produced in the mixing device M in response to this phase shift causing an a.c. voltage $f_M$ to be provided at the output of the mixing device. The frequency of this a.c. voltage changes in dependence on the velocity with which the target moves. In the known evaluation circuit arrangement the direct voltage signal, which is constant, can be separated from this a.c. voltage in a simple manner and applied to an indicator or an evaluator.

In accordance with the invention means is provided for keying the evaluation circuit in addition to keying the transmitter. To this end there is provided a clock generator having the frequency $f_t$, i.e. the clock repetition frequency. The operating mode of the invention will now be further explained with reference to FIG. 1.

Figure 1:
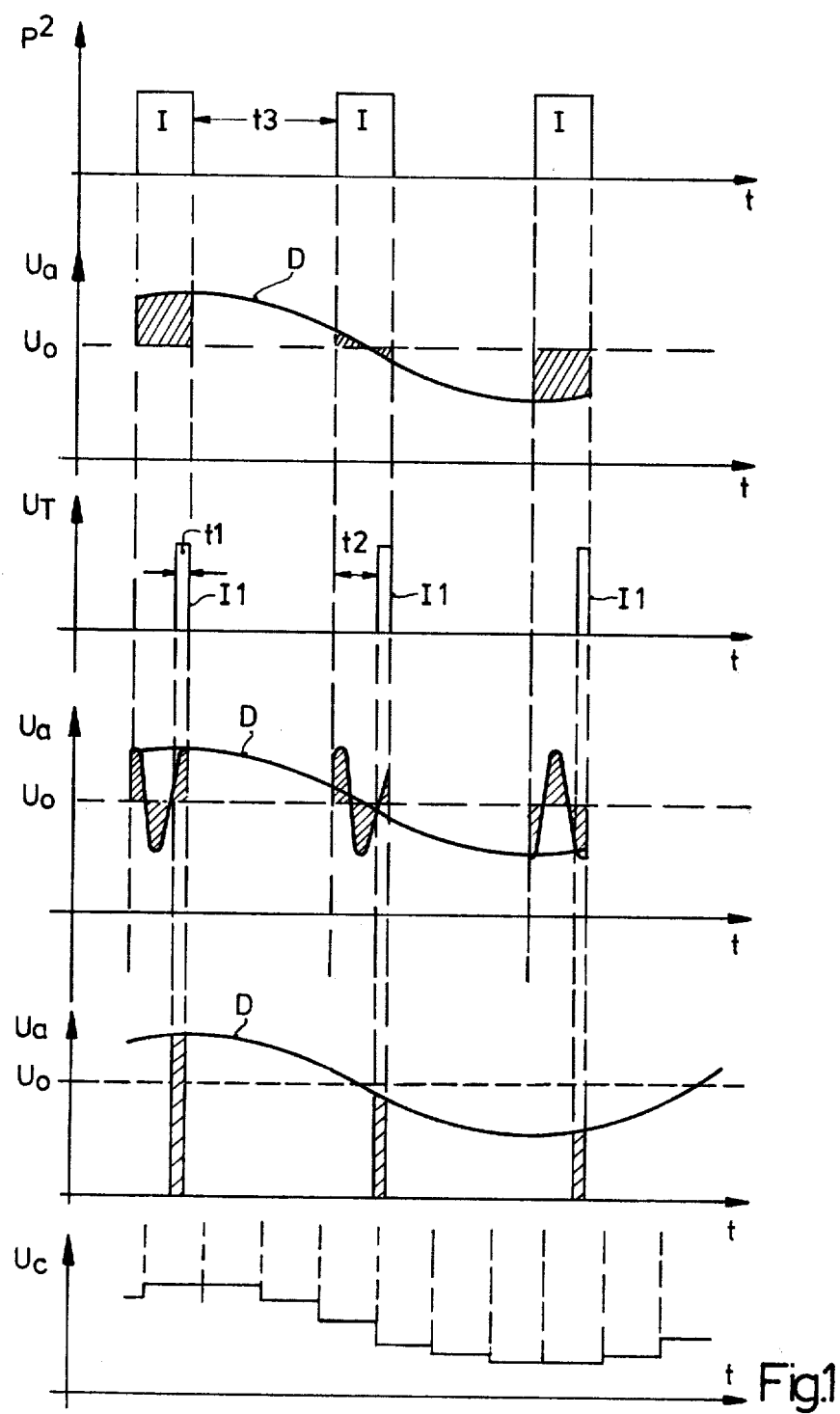
FIG. 1 shows diagrams of the individual pulses and the evaluations.

The keying operation causes the oscillator, i.e. the transmitter, to be keyed with the pulses I, that is to say its d.c. voltage supply is switched on and off, and, as shown in the first line of FIG. 1, this voltage remains switched on during the duration of the pulse I, and is in the switched-off condition during the period of time t3. This is the pulse interval between the HF pulses. The power output P2 of the oscillator is plotted versus the time. The signal obtained from the mixing device M has a doppler voltage in the case of a moving target. This voltage is shown in line 2 as being the a.c. voltage D, whereas the direct voltage produced in the case of a stationary target is denoted by $U_O$. The a.c. voltage which changes in response to the doppler signal is of course much lower than the voltage $U_O$, the voltage $U_O$ being, for example, 1 to 2 V, whereas the difference between $U_O$ and the amplitude, i.e. the largest amplitude of the a.c. voltage signal D, is, for example, 0.1 mV. The evaluation circuit is constructed such that it evaluates the a.c. voltage signal. That is to say the hatched range is applied to evaluation circuit to where it is integrated. In the evaluation circuit is an integrating capacitor, which is charged and discharged across a resistor. Reliable operation of this circuit is obtained only when the frequency $f_o$ of the transmitter signal does not change, that is to say when it remains constant. For intrusion detection systems, particularly with very small modules having Gunn elements it is, however, extremely difficult to keep the frequency stable without making a comparatively great design effort. If this effort is not made, the frequency of the transmitter drifts during these pulses, as is generally known. It was, for example, found, that the frequency $f_o$ shifts approximately 10 MHz, considerable shifting occurring at the start of the pulses and less shifting occurring towards the end of the pulse I. The reason is that the semiconductor crystal of the Gunn element heats up during the pulses and cools again in the pulse interval, which causes its HF properties to change. The operation of the doppler radar device is essentially affected by this effect.

This needs some further explanation. The microwave transmitter radiates the HF-signal which has the frequency $f_o$ and which is reflected from the target. The signal follows a transit path of length 2L. A reference signal derived from the transmitter send signal and the received signal are applied in known manner to the mixing device. There is now a phase difference, resulting from the difference in transit time, between the reference signal and the received signal. The phase difference depends on the transit path and on the high frequency $f_o$, there being the following relations:

$$\phi = 2\pi/\lambda \cdot 2L = (2\pi \cdot f_o)/c \cdot 2L = (4\pi \cdot f_o \cdot L)$$

The transmitter frequency $f_o$ is constant for a continuous-wave doppler radar device. When the transmit path length changes, that is to say when a target moves into the controlled space, the phase changes. When $2L/\lambda = 1$, the phase shifts through 360° or $2\pi$, respectively. For $f_o = 10$ GHz, $\lambda = 3$ cm, $L = \lambda/2 = 1.5$ cm. So the output voltage passes through a complete cycle when the target moves 1.5 cm. When the target moves, the output voltage is an a.c. voltage having a frequency proportional to the velocity of the target. Consequently, as described above, an a.c. voltage is produced at the output of the mixing device. This voltage is proportional to cos $\phi$ and can be evaluated.

When, however, the frequency of the pulse in a pulsed doppler radar device changes, $\phi$ changes in the case of a stationary target. So, the output voltage of the mixing device is not constant during the pulse. When the change in the frequency is, for example, 10 MHz during the pulse within the pulse period of the HF pulse and the distance to the target is 15 m, the phase is shifted exactly through 360°. All this can be easily checked on the basis of the above-mentioned formulae: when L is constant, then it holds that:

$$\phi = \frac{2\pi}{c} \cdot 2L \, (f_o - f_E) = \frac{2\pi \cdot 2L \cdot \Delta f}{c}$$
$$\text{For } \phi = 360° \, \Delta \, 2\pi$$
$$\frac{2L \cdot \Delta f}{c} = 1$$
$$\text{or } L = \frac{c}{2\Delta f} = \frac{3 \cdot 10^8 \text{ m/s}}{2 \cdot 10^7 \text{ m/s}} = 15 \text{ m}.$$

So the output voltage at the mixing device M consists of a complete sine-wave oscillation, which beats the voltage $U_O$.

In the case of a stationary target the phase at the start of the pulses I is constant so that all pulses have the same shape. When, however, the target moves, the start phase is changed. For a uniform movement of the target the oscillation is uniformly shifted over the pulse, as shown in line 4 of FIG. 1.

The evaluation can be effected by means of a conventional sample-and-hold circuit in which a capacitor is charged during the overall pulse duration. Its charge corresponds to the integral of the pulses, which depends on the starting phase and is therefore the same for each pulse. When L is equal to 15 m, no doppler signal can be obtained. Consequently, the output voltage of the pulsed doppler radar device decreases to a considerably greater extent versus the distance as would be the case for a continuous wave device. The known function of $U_a = f(L)$ must be multiplied by a cosine function whose zero position is at 15 m.

To mitigate this drawback, the invention proposes a different sample-and-hold circuit having a sampling time which is not identical to the pulse duration. According to the invention a short period of time is selected and a pulse is produced by the clock generator T, shown in FIG. 2, which, in accordance with the invention, lasts for approximately 10 to 20% of the pulse duration of the high frequency pulse I as is illustrated in line 3 in FIG. 1, this pulse has the width t1 and is denoted as IL. This renders it possible, as shown in line 4 of FIG. 1 to always select a small region from the doppler signal and consequently from the received signal. In this period of time the evaluation circuit A sees always only a small portion of the continuous signal obtained because of the 10 MHz shift of the high frequency signal. The amplitude, however, of this continuous signal in this short period of time is now determined by the doppler signal D and consequently there is again a voltage variation corresponding to the doppler signal D, at the output of the evaluation circuit, as shown in line 5 of FIG. 1. The charging capacitor and the associated load resistor have a time constant which is high relative to the period of time t3+t2, that is to say high relative to the period of time occurring between two pulses I1. A staircase voltage obtained from the voltage of FIG. 5 is illustrated in line 6 of FIG. 2. This staircase voltage approaches the doppler frequency and can be applied to a corresponding load resistor of the evaluation circuit.

Figure 3:
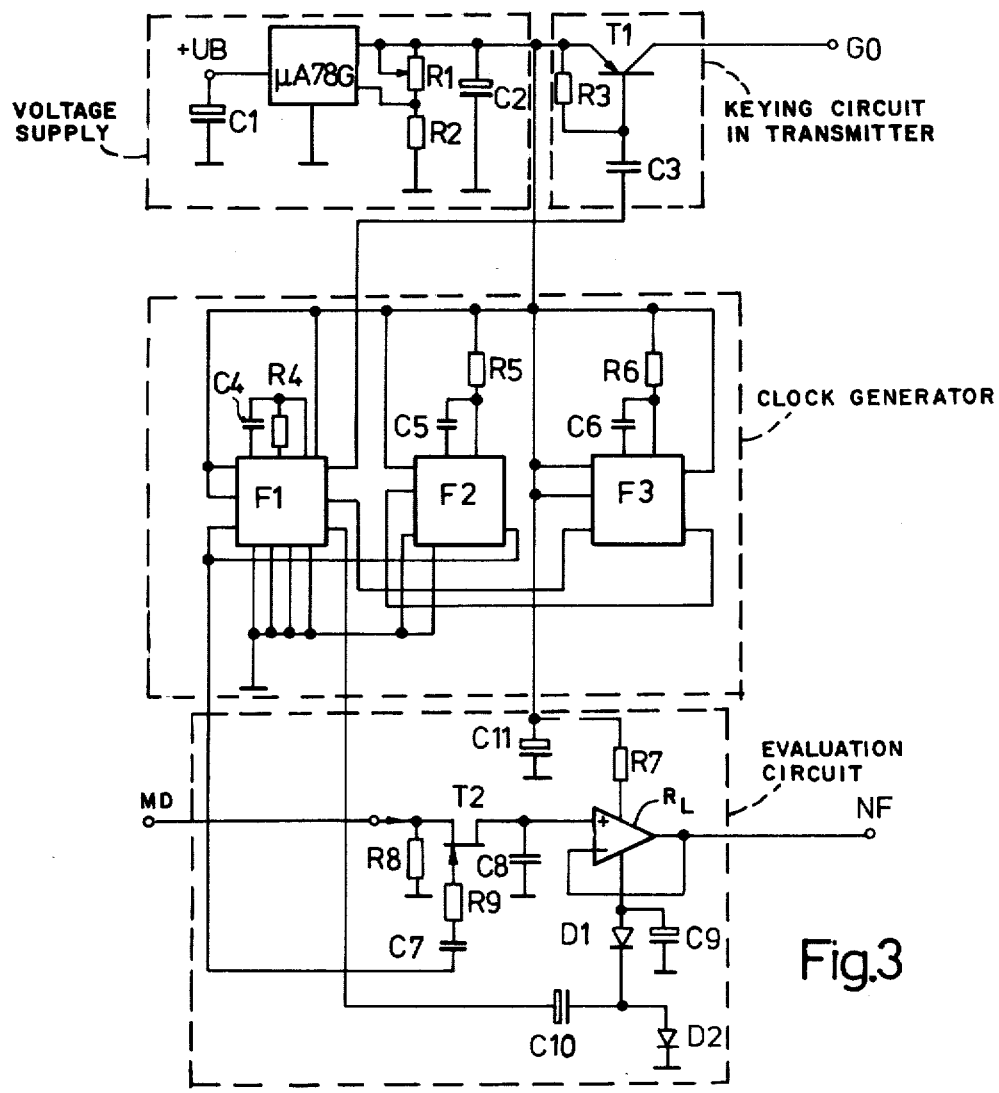
FIG. 3 is a detailed circuit diagram including the evaluation circuit arrangement.

FIG. 3 shows the detailed circuit diagram. The upper portion of this Figure shows the actual voltage supply. A supply voltage source UB is present, which is followed by a smoothing capacitor C1 and thereafter by a so-called integrated voltage controller, for example of the type μA 78G whose output voltage is adjustable via the resistors R1 and R2. This output voltage is filtered once again at the capacitor C2 resulting in a very well-stabilized direct voltage across capacitor C2. This voltage is applied to the transistor T1 and the output of the transistor is connected to the Gunn oscillator input at GO. This is the feeding point of the pulse voltage for the high frequency transmitter. The transmitter is keyed by means of its transistor T1 via capacitor C3. To this end, flip-flops F1, F2 and F3 have been provided, the first, F1, generating the period of time t3, the second, F2, generating the period of time t1 and the third, F3, generating the period of time t2. F1 consists, for example, of the integrated circuit arrangement HEF 4047B. Its upper terminals are, from left to right, 1, 2, 3 and 14, the terminals on the left-hand side are, from top to bottom, 8, 4 and 6, the terminals on the right-hand side are, from top to bottom 10, 11 and 13; and the bottom terminals are, from left to right 5, 7, 9 and 12. These figures indicate the numbers of the terminals of the IC. Full details can be found in the corresponding and relevant documents. Frequency-determining components are the capacitor C4 and the resistor R4.

In the arrangement comprising flip-flop F2, the terminals on the upper side from left to right are 1, 2; those on the left hand side from top to bottom are 3, 5, 4; the right-hand side terminal is 6; and the bottom side terminal is 8. An IC of the type HEF 4528B may be used in such a way that one half of this IC is used as F2, the other half as the flip-flop F3. Here, the terminal arrangement of F3 is as follows: upper side from left to right terminals 15, 14; left-hand side from top to bottom 13, 11, 12; and right-hand side from top to bottom 16, 10. The drawing shows the current supply of these ICs. The ICFL effects keying of the transmitter by means of transistor T1 via capacitor C3.

The lower portion of FIG. 3 shows the actual sample-and-hold circuit arrangement of the evaluation circuit. It comprises an operational amplifier, for example type μA 741, which functions as a load resistance $R_L$. To realize a high input resistance, the amplifier is operated as a voltage follower. The charging capacitor, as described above, is the capacitor C8. This capacitor is charged via the switch T2 and stores its charge because the input resistance of the operational amplifier μA 741 is very high. The output of the mixing device which comprises, for example, a mixer diode is denoted by MD. It operates into a load resistor R8. Keying of transistor T2, which is a field effect transistor, is effected via the resistor R9 and capacitor C7, which are connected to the above-mentioned group of flip-flops. The operational amplifier is supplied with current via R7 and via the diodes D1, D2, which produce the negative supply voltage for the amplifier from a square-wave voltage produced in the clock generator portion, in conjunction with the capacitors C9 and C10. Finally, the output signal can be taken from the terminal NF as the low-frequency signal. It is not amplified (voltage follower).

The components shown in FIG. 3 have, for example, the following values:

The voltage +UB is 12 V, the transistor T1 is of the type BT 556, the transistor T2 is of the type BSV 80, the diodes D1 and D2 are of the type BAX 16.

The capacitors have the following values:

| | | |
|---|---|---|
| C1 = 10 μF, | C5 = 470 pF, | C9 = 47 μF, |
| C2 = 100 μF, | C6 = 1 nF, | C10 = 1 μF, |
| C3 = 1 μF, | C7 = 10 nF, | C11 = 4.7 μF, |
| C4 = 10 nF, | C8 = 1 nF, | |

The resistors have the following values:

| | | |
|---|---|---|
| R1 = 10 kOhm, | R5 = 5.6 kOhm, | R8 = 10 kOhm, |
| R2 = 56 kOhm, | R6 = 15 kOhm, | R9 = 10 kOhm, |
| R3 = 4.7 kOhm, | R7 = 1.8 kOhm, | R10 = 10 kOhm, |
| R4 = 6.8 kOhm. | | |

The following additional information can be given as regards lines 5 and 6 of FIG. 1: In correspondence with line 3 in FIG. 1, line 5 shows the hatched areas for the three exemplary pulses I1. The staircase voltage shown in line 6 can not be obtained with such a great time between the pulses, but they must be closer together. This is shown in line 6 where each dotted line shown in the vertical direction corresponds to the start of a pulse I1. There are, therefore, 10 pulses I1 present in the area shown in the drawing.

What is claimed is:

1. A pulsed doppler radar system comprising a transmitter for transmitting pulse-shaped signals and a receiver having a mixing device to which the transmitter signal and a received transmitter signal reflected from a target are applied, also comprising an evaluation circuit connected to the mixing device, characterized in that the evaluation circuit is of such a construction that the output signal of the mixing device is evaluated only during an evaluation period which is only a portion of the pulse duration of each transmitter pulse.

2. A pulsed doppler radar system as claimed in claim 1 and further including generator means electrically connected to the evaluation circuit for keying said circuit such that the evaluation period is 10 to 20% of the pulse duration and occurs at the end of the pulse duration.

3. A pulsed doppler radar system as claimed in claim 1, characterized in that the evaluation circuit comprises a sample-and-hold circuit which samples the output signal of the mixing device in the evaluation period, this sample-and-hold circuit comprising a capacitor for storing the signal value sampled in the evaluation period and comprising a load resistor which is connected across the capacitor and is rated so that the discharge periods of the capacitor and the load resistor are long relative to the pulse repetition period of the said pulses.

* * * * *